(12) United States Patent
Duckworth et al.

(10) Patent No.: US 10,321,093 B2
(45) Date of Patent: *Jun. 11, 2019

(54) AUTOMATED LAYOUTS OPTIMIZED FOR MULTI-SCREEN AND MULTI-CAMERA VIDEOCONFERENCING CALLS

(71) Applicant: Polycom, Inc., San Jose, CA (US)

(72) Inventors: Mark Duckworth, Merrimack, NH (US); Anat Levy, Petach Tikva (IL); Jesse Coleman, Manchaca, TX (US)

(73) Assignee: Polycom, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/427,902

(22) Filed: Feb. 8, 2017

(65) Prior Publication Data
US 2017/0150099 A1 May 25, 2017

Related U.S. Application Data

(63) Continuation of application No. 14/965,469, filed on Dec. 10, 2015, now Pat. No. 9,602,771.

(60) Provisional application No. 62/090,212, filed on Dec. 10, 2014.

(51) Int. Cl.
*H04N 7/14* (2006.01)
*H04N 7/15* (2006.01)
*H04N 5/247* (2006.01)

(52) U.S. Cl.
CPC ............ *H04N 7/147* (2013.01); *H04N 5/247* (2013.01); *H04N 7/142* (2013.01); *H04N 7/152* (2013.01)

(58) Field of Classification Search
None
See application file for complete search history.

(56) References Cited

U.S. PATENT DOCUMENTS

| | | | |
|---|---|---|---|
| 7,113,200 B2 | 9/2006 | Eshkoli | |
| 7,561,179 B2 | 7/2009 | Johansen | |
| 2009/0009587 A1 | 1/2009 | Lindbergh | |
| 2012/0200658 A1* | 8/2012 | Duckworth | G06F 3/147 348/14.07 |
| 2013/0027502 A1* | 1/2013 | Skramstad | H04N 5/265 348/14.01 |
| 2013/0106988 A1 | 5/2013 | Davis | |

* cited by examiner

*Primary Examiner* — Maria El-Zoobi
(74) *Attorney, Agent, or Firm* — Blank Rome, LLP

(57) ABSTRACT

A videoconferencing device that determines a spatial arrangement of the video streams output at a first endpoint based on a number of display devices being utilized at the first endpoint and a number of cameras being utilized at each of the one or more additional endpoints.

20 Claims, 16 Drawing Sheets

AUTOMATED LAYOUTS OPTIMIZED FOR MULTI-SCREEN AND MULTI-CAMERA VIDEOCONFERENCING CALLS

CROSS-REFERENCE TO RELATED APPLICATIONS

This application is a continuation of U.S. application Ser. No. 14/965,469, filed Dec. 10, 2015, which claims the benefit of the filing date of U.S. Provisional Application No. 62/090,212, filed on Dec. 10, 2014, the entire contents of which are incorporated herein by reference.

BACKGROUND

Videoconferencing entails exchange of audio, video, and other information between at least two participants. Generally, a videoconferencing endpoint at each participant location will include a camera for capturing images of the local participant and a display device for displaying images of remote participants. The videoconferencing endpoint can also include additional display devices for displaying digital content. In scenarios where more than two endpoints participate in a videoconferencing session, a multipoint control unit (MCU) can be used as a conference controlling entity. The MCU and endpoints typically communicate over a communication network, the MCU receiving and transmitting video, audio, and data channels from and to the endpoints.

Telepresence technologies provide enhanced videoconferencing experience to participants so that the near end participants feel as if they are present in the same room as the far end participants. Telepresence videoconferencing can be provided for various conferencing systems, ranging from two person point-to-point videoconferencing systems to multi-participant multipoint videoconferencing systems. Typically, telepresence utilizes multiple cameras to capture images of near end participants and multiple displays to display images of far end participants. Multiple video streams are transmitted from multiple endpoints to the MCU to be combined into one or more combined video streams that are sent back to the endpoints to be displayed on multiple display devices. For example, in a telepresence system involving three endpoints, each endpoint having three cameras, the MCU will receive nine video streams. The MCU will have to combine the nine received video streams into one or more combined video streams, which are sent back to be displayed on the display devices at each endpoint. These nine video streams will have to be laid out for each endpoint based on the number and type of displays at each endpoint. Furthermore, although the MCU may receive the information from the endpoint that the current speaker is located at that endpoint, with more than one video stream being received from each endpoint the MCU may not be able to determine which one of the multiple video streams includes the current speaker. Thus, dynamically selecting one of many video streams received from an endpoint for prominent display may be difficult.

Commonly-owned U.S. Pat. No. 8,537,195, which is hereby incorporated by reference in its entirety, describes various techniques for assigning telepresence streams to a display layout. However, even some embodiments of such systems may not utilize all of the available screens to show the active speaker and other participants in a mixed interactive telepresence ("ITP") call environment. Additionally, with current layout management tools, multi-screen environment administrators have a high upfront management task to coordinate layouts for end user environment scenarios and these often fail to meet the desired speaker switching needs for the end users. For example, many current active speaker switching embodiments prioritize sites in a call based on number of camera streams, which does not always factor in the active speaker or other key meeting analytics to optimize the user experience with automated layouts. This leads to scenarios where the active speaker may not be shown at all on screens at a particular location. Another undesirable scenario that can arise in multi-screen environments is when active speaker locations move around so much that users are disoriented and unsure of where to focus.

In some currently available embodiments, conference rooms with multiple monitors may locate the main speaker on a single monitor, usually in the center, with other participants being shown in a filmstrip view at the bottom. Various embodiments of a film strip arrangement, including dynamic assignment of users to the various view positions, are described in Provisional U.S. Patent Application 62/002,561, filed May 23, 2014 and entitled, "Method And System For New Layout Experience In Video Communication," which is hereby incorporated by reference in its entirety.

In some variations of such an arrangement, if the speaker is a single camera site and the conference room viewing the speaker has three monitors, the speaker might show up full screen on the center monitor, while other participants would show on the left and right monitors as film strips at the bottom of a mostly black screen.

Other conventional videoconferencing arrangements reposition video streams based on the location of the current speaker. These arrangements can be unnecessarily jarring to viewers, especially when endpoints are utilizing different numbers of cameras and outputting different numbers of video streams.

Therefore, in order to overcome this problem arising in the realm of video conferencing, there is a need for rule-based systems for controlling video layouts in multi-site, multi-camera videoconferencing.

SUMMARY

Two new videoconference layout modes are provided: A speaker priority mode, which may be used to ensure that video streams from an endpoint that includes a current speaker are displayed sufficiently prominently, and a participant priority mode, which can be used when it is desirable for all participants in a conference to be displayed as effectively as possible.

The speaker priority mode may include one or more reserved screens that include primary display areas allocated for current speakers. The number of reserved screens output at an endpoint may be based on a number of display devices being utilized at the endpoint and a number of cameras being utilized at each of the other endpoints.

DETAILED DESCRIPTION

Figure 1:
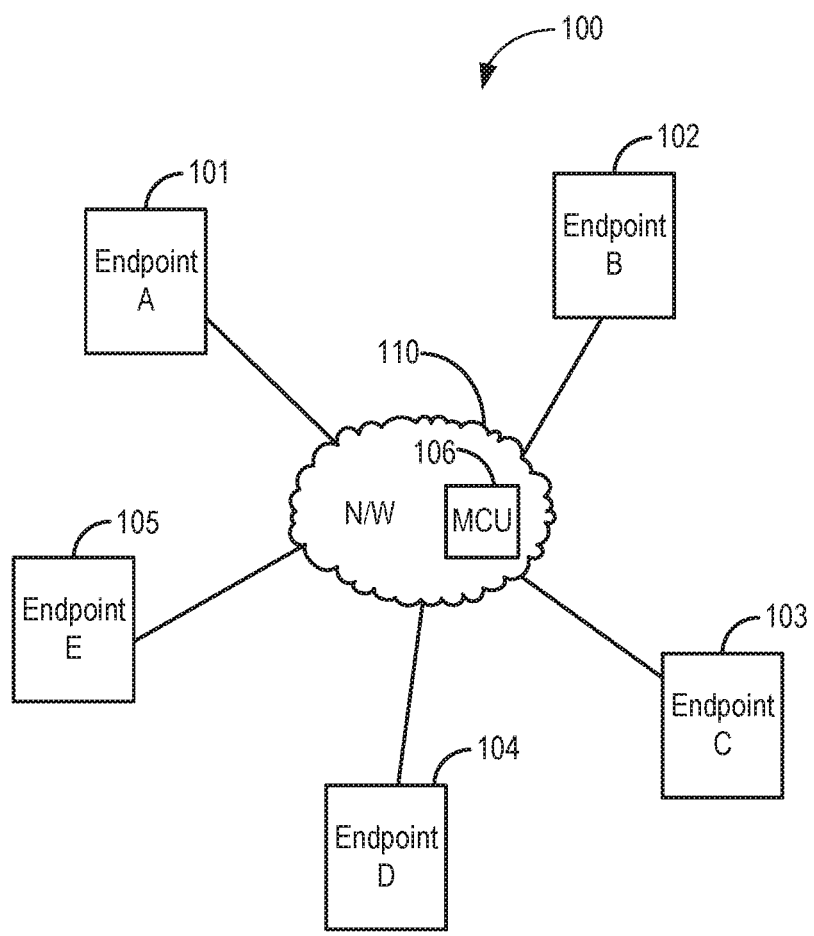
FIG. 1 depicts an exemplary multipoint videoconferencing system.

FIG. 1 depicts an exemplary multipoint videoconferencing system 100. System 100 can include network 110, one or more multipoint control units (MCU) 106, and a plurality of endpoints A-E 101-105. Network 110 can be, but is not limited to, a packet switched network, a circuit switched network, or a combination of the two. Endpoints A-E 101-105 may send and receive both audio and video data. Communications over the network can be based on communication protocols such as H.320, H.324, H.323, SIP, etc., and may use compression standards such as H.263, H.264, etc. MCU 106 can initiate and manage videoconferencing sessions between two or more endpoints. Generally, MCU 106 can mix audio data received from one or more endpoints, generate mixed audio data, and send mixed audio data to appropriate endpoints. Additionally, MCU 106 can receive video streams from one or more endpoints. One or more of these video streams may be combined by the MCU 106 into combined video streams. Video streams, combined or otherwise, may be sent by the MCU 106 to appropriate endpoints to be displayed on their respective display screens. As an alternative, MCU 106 can be located at any one of the endpoints A-E 101-105.

Figure 2:
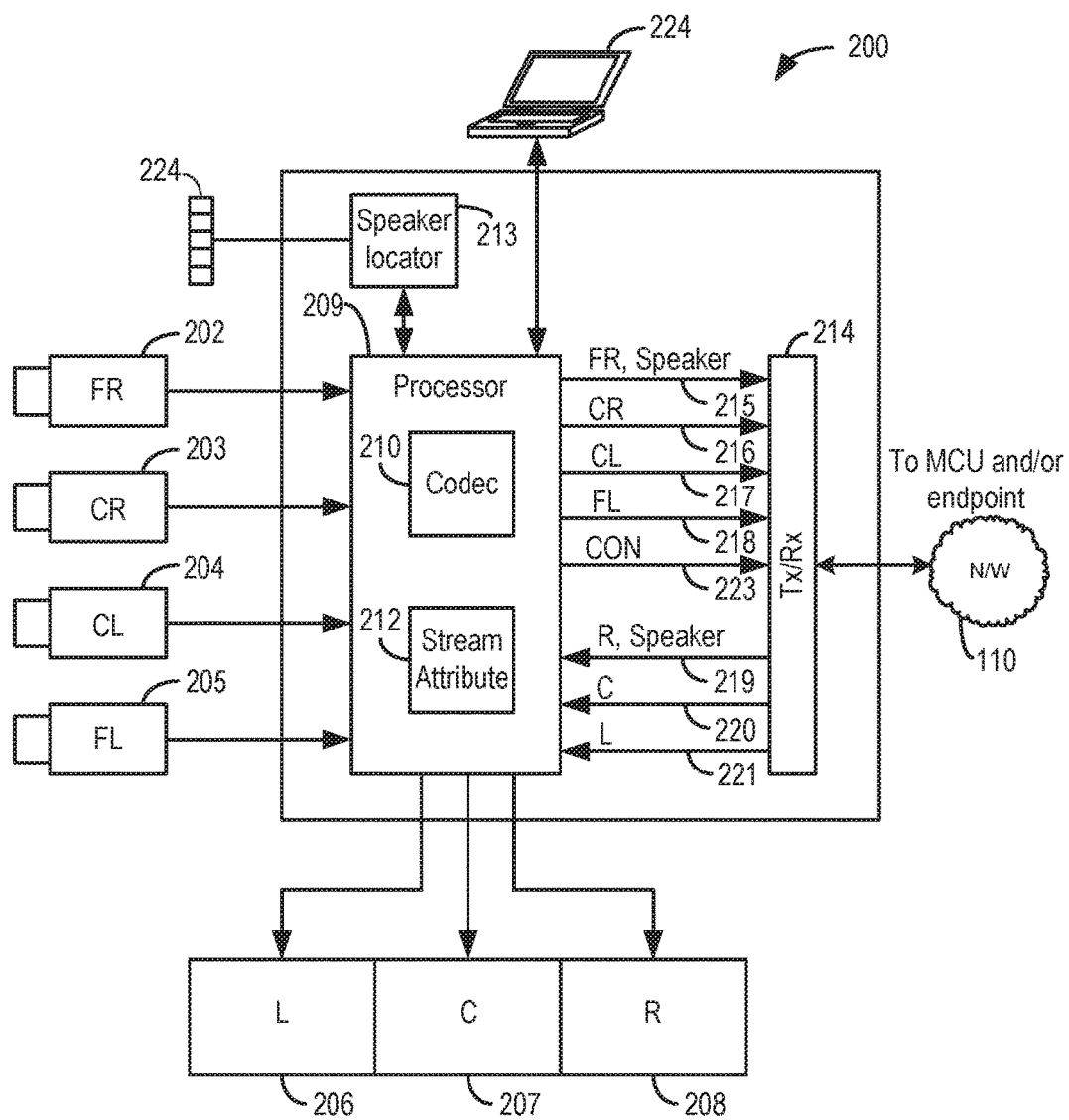
FIG. 2 shows an exemplary videoconferencing endpoint.

FIG. 2 shows an exemplary endpoint 200 with multiple cameras and multiple display devices. Cameras 202-205 capture images of the local participants present in the conference room, and can be arranged in a row to capture different portions of the conference room. Accordingly, cameras 202-205 can be labeled FR (far-right), CR (center right), CL (center left), and FL (far left). Of course, these labels are only exemplary. Different labels can also be used, for example, if camera 205 is used to capture images of all participants then it can be labeled as WR (whole room). In another instance, camera 202 can be a pan-tilt-zoom (PZT) type camera that captures the image of the current speaker only, from among the local participants, and thus can be labeled CS (current speaker). Labels or attributes can be associated with the cameras and stored in memory in the processor 209.

Processor 209 can include a codec 210 for compressing and decompressing video and audio streams. For example, codec 210 can compress video streams generated by cameras 202-205 to generate compressed video streams, which can be transmitted to remote endpoints and/or an MCU. Additionally, codec 210 can decompress video streams received from the remote endpoints or the MCU, and display the video streams on display devices 206, 207, and 208. Codec 210 can include video codecs such as H.261 FCIF, H.263 QCIF, H.263 FCIF, H.261 QCIF, H.263 SQCIF, H.264, etc., and audio codecs such as G.711, G.722, G.722.1, G.723.1, etc.

Processor 209 can communicate with a speaker locator module 213, which determines the location of the current speaker, i.e., the participant that is currently speaking. Information provided by speaker locator module 213 can be used by processor 209 to determine which of the received video streams includes the current speaker. Speaker locator module 213 can employ a microphone array 224 that analyzes the sound received from a source, such as the current speaker, to determine the location of the current speaker with respect to the microphone array 224. The microphone array 224 can include a series of spaced microphones that can be arranged horizontally, vertically, or in combination. Typically, at least one of the microphones in the array can be assigned as a reference microphone. A number of candidate locations can be predetermined where the distance of the candidate locations from each of the microphones is known. Acoustic signals captured by each of the microphones can be delayed with respect to the acoustic signal captured by the reference microphone. This delay can be, in part, a function of a candidate source location and microphone location with respect to the reference microphone. Signal energies of each of the delayed signals associated with each candidate location can then be determined. Subsequently, the candidate location associated with the highest signal energy can be selected as the location that best estimates the actual location of the audio source. In other words, using maximum likelihood estimation, a predetermined candidate source that is likely to be the best estimate of the actual location of the audio source can be selected as the location of the audio source. Clearly, the accuracy of the estimation can improve with an increase in the number and spatial distribution of the candidate locations. For example, 61 candidate locations can be used at an approximate radial distance of 10 feet from the microphones. More details on determining locations of participants using microphone arrays are disclosed in commonly assigned U.S. Pat. No. 6,912,178 entitled "System and method for computing a location of an acoustic source," by Chu et al., and is hereby incorporated by reference.

Typically, the spatial relationship between the microphone array 224 and the cameras 202-205 remains fixed. Therefore, location of the current speaker known with respect to the microphone array 224 can be readily transformed into the location of the current speaker with respect to the cameras simply by changing the frame of reference. Each camera, with its particular pan-zoom-tilt settings, can capture a particular portion of the conference room, the boundaries of which portion can be predetermined. Thus, the processor 209 can determine if the location of the current speaker, as expressed within the reference frame of the camera, lies within the portion of the conference room captured by that camera. If the current speaker is located within the portion of the conference room captured by a camera, processor 209 can instruct the stream attribute module 212 to assign the attribute "Speaker" to the video stream generated by that camera.

Stream attribute module 212 can assign attributes to the outgoing streams. These attributes can qualify the outgoing video stream in a manner that is useful for the MCU and/or the remote endpoint for rendering and displaying the video stream. These attributes can be added to outgoing streams during transmission. For example, protocols such as H.323 and H.320 can be extended to include attribute definitions that may be used to label outgoing data streams. Video streams can have various attributes. For example, video streams can have positional attributes that identify the relative location of the camera that is the source of that video stream. As shown in FIG. 2, outgoing streams 215-218 can have attributes that indicate the relative position of their source cameras. Stream 215, for example, is labeled "FR" because it is sourced from the camera 202, which is placed in the far right (FR) position. Similarly, video stream 217 is labeled "CL" because its source camera 204 is in a center left (CL) position.

Video streams can also have role based attributes such as "people" and "content." Video streams can be labeled with "people" attribute if the video streams include images of people/participants. Role based attributes can further have hierarchical classification. For example, where a number of participants in a video conference take turns presenting information, classification of "people/presenter" and "people/audience" may be provided. A "people/presenter" attribute can indicate that the associated video stream includes images of people that are to be prominently displayed irrespective of whether the video stream includes a speaker or not. Video streams that contain digital content, such as presentations, can have a "content" attribute. For example, processor 209 receives data content from computer 224, which data content can include presentations, documents, videos, etc. Data content can be compressed and given the attribute "CON." The endpoint can also include a dedicated data content display, which displays data streams received from MCU or remote endpoints.

Video streams can also have more than one attribute. For example, a video stream can have both role based and "Speaker" attribute, such as "people/audience, Speaker," "people/presenter, Speaker," etc. The "Speaker" attribute can be assigned independent of the role of the video stream. For example, even if the current speaker is included in a video stream having the "people/audience" role, a "Speaker" attribute can be additionally assigned to that video stream. As another example, video streams can have both positional and "Speaker" attribute, such as, video stream 215—where in addition to having the "FR" attribute it can also have the "Speaker" attribute. As previously described, processor 209 can determine which camera is capturing the current speaker. The processor can then add the "Speaker" attribute to the video stream generated by that camera. In the example shown in FIG. 2, the current speaker is being captured by camera 202; therefore, video stream 215 has the attribute "Speaker" associated with it. If the location of the current speaker changes, then the processor can reassign the "Speaker" attribute to the video stream that currently includes the current speaker. For example, if a different speaker begins to talk, and the image of that current speaker is captured by camera 204, then video stream 217 will be assigned the attribute "Speaker" in addition to the "CL" attribute.

Although only a single outgoing stream 215 of FIG. 2 is shown to have multiple attributes, such multiple attributes can be assigned to more than one stream. For example, stream 218 also can have multiple attributes such as "people/presenter" and "FL" assigned to it. Thus, video streams can be assigned one or more attributes, and the assigned attributes can be role based, camera position based, current speaker based, or based on any other selected property. It is understood that the attributes shown in FIG. 2 can be encoded for transmission.

Video streams, data streams, and audio streams, along with their attributes can be transmitted by the endpoint 200 to an MCU or a remote endpoint via network 110. A transmitter/receiver 214 can serve as a physical interface between the endpoint 200 and the network 110. Tx/Rx 214 can also receive video streams from the MCU or remote endpoints. For example, video streams 219-221 are received by the processor 209. Video streams 219-221 can include attributes that qualify the video streams and can be used by the processor 209 for rendering or reproducing the video streams. For example, video stream 219 has attributes "R" and "Speaker." Processor 209 can display video stream 219 on display device 208, which is positioned to the right. Furthermore, because video stream 219 has the "Speaker" attribute as well, the video stream may be displayed with more prominence. Likewise, video stream 220 with attribute "C" can be displayed on display device 207 and video stream 221 with attribute "L" can be displayed on display device 206.

Figure 3:
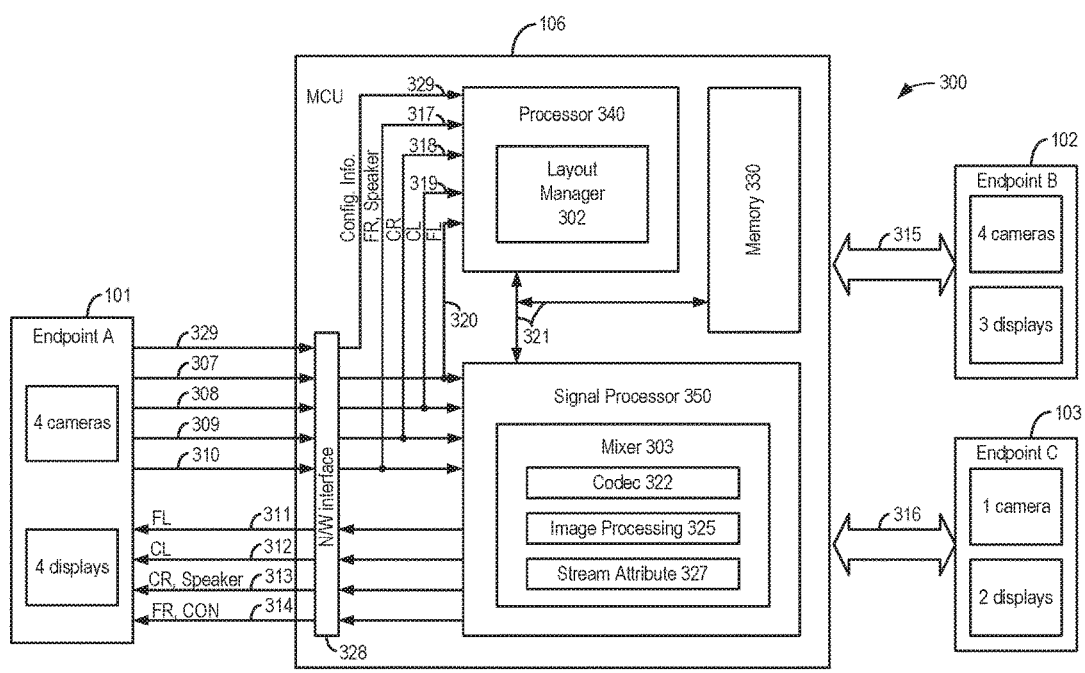
FIG. 3 shows an exemplary videoconferencing system.

FIG. 3 shows an exemplary conferencing system 300 in which two or more endpoints communicate with each other via an MCU 106. Endpoints 101, 102, and 103 can be similar to the exemplary endpoint shown in FIG. 2. Each endpoint can have various configurations of cameras and display screens for providing a telepresence experience to their respective participants. For example, endpoint A 101 can include 4 cameras and 4 display devices, endpoint B 102 can include 4 cameras and 3 display devices, while endpoint C 103 can include 1 camera and 2 display devices. Video streams can be exchanged between each endpoint and the MCU 106. For clarity, only video streams to and from endpoint A 101 have been shown in detail. MCU 106 can also include network interface 328, via which video, audio, and signaling data can be sent and received.

MCU 106 includes memory 330 and one or more hardware processors, such as a processor 340 and a signal processor 350. The memory 330 may include any tangible computer-readable storage medium configured to store instructions that, when executed by the one or more processors 340 and 350, cause the MCU 106 to perform the process steps described herein. The memory 330 may include, for example, read-only memory (ROM), random-access memory (RAM), magnetic disc storage media, optical storage media, solid state (e.g., flash) memory, etc. The processor 340 may be any hardware device configured to carry out instructions stored in the memory 330 by performing the arithmetic, logical, control, and input/output (I/O) operations specified by those instructions. The processor 340 may include, for example, the Intel Core®, Pentium® and Celeron® processor families from Intel, the Cortex and ARM processor families from ARM, etc. (INTEL CORE, PENTIUM and CELERON are registered trademarks of the Intel Corporation. CORTEX is a registered trademark of the ARM Limited Corporation. ARM is a registered trademark of the ARM Limited Company.) The signal processor 350 may be any hardware device configured to receive, arrange, and output video streams as described herein. The processor 340 and the signal processor 350 may be integrated in a single chip, for example the TMS320DM6467 or TMS320DM6468, which are provided by Texas Instruments Corporation. The processor 340 and/or signal processor 350 may also include internal memory including (for example, cache memory).

MCU 106 can include a layout manager 302 and a mixer 303. The layout manager 302 can determine display or video layouts, which include an arrangement of video streams sent to each endpoint. In determining video layouts, the layout manager 302 not only determines which ones of the received video streams are to be sent to an endpoint, but also the spatial arrangement in which they are to be displayed. This determination can be based on the attributes associated with the received video streams and configuration information associated with the endpoint. The layout manager 302 can determine attributes associated with each video stream received by MCU 106. For example, attributes "FR, Speaker" 317, "CR" 318, "CL" 319, and "FL" 320 associated with video streams 307, 308, 309, and 310 can be received from endpoint A 101. Similarly, video streams and their attributes can also be received from endpoints B 102 and C 103 (denoted, for simplicity, by 315 and 316, respectively), and any additional endpoints. Configuration information 329 received from each endpoint can include number of display devices, aspect ratio and resolution of display devices, existence of a dedicated current speaker display device, type of encoding used, etc. As will be described with further detail below, the layout manager 302 can generate arrangement of video streams sent to each endpoint. This arrangement is communicated to the mixer 303 for execution by way of signal path 321.

Mixer 303 can receive video streams from one or more endpoints. Mixer 303 can execute the arrangement of video streams determined by the layout manager 302. For example, mixer 303 can receive video streams from endpoints A 101, B 102, and C 103, combine the video streams based on signals 321 received from the layout manager 302, and send combined video streams back to each endpoint. Mixer 303 can include a codec 322 for decoding incoming video and audio streams and encoding outgoing video and audio streams. For example, audio codecs can include standard codecs such as, G.711, G.722, G.722.1, G.723.1, etc. Video codecs can include standard codecs, such as, H.261 FCIF, H.263 QCIF, H.263 FCIF, H.261 QCIF, H.263 SQCIF, H.264, etc. Codec 322 can also change the encoding scheme of outgoing audio and video streams based on the encoding scheme used at the receiving endpoint.

Commonly, the layout manager 302 is a program stored in the memory 330 and executed on the processor 340 while the mixer 303 is a program stored in the memory 330 and executed on the signal processor 340 (or multiple signal processors 340). Mixer 303 can also include an image processing module 325 for carrying out manipulation of video frames received from various endpoints. Such manipulations can include combining two or more video frames into one frame, scaling, cropping, overlaying, etc., more details of which are disclosed in commonly assigned U.S. patent application Ser. No. 12/581,626 entitled "System and method for combining a plurality of video stream generated in a videoconference," by Avishay Halavy, and is hereby incorporated by reference.

Mixer 303 can also include a stream attribute module 327 for assigning attributes to outgoing streams. For example, stream attribute module 327 can assign attributes "FL", "CL", "CR, Speaker", and "FR, CON" to streams 311, 312, 313, and 314, respectively. The stream attribute module 327 can receive instructions on which attributes to assign to particular outgoing video streams from the layout manager 302.

MCU 106 can be compliant with the ITU standards, such as, but not limited to, H.320, H.323, and H.324. Accordingly, the processor 340 can be part of a media controller (MC), while the signal processor 350 can be part of a media processor (MP). Mixer 303 can be implemented on application specific integrated circuits (ASICs), microcontrollers, FPGAs, hardware/firmware combination, software running on microprocessors, etc. Various modules within the mixer 303, e.g., codec 322, Image processing module 325, and stream attribute module 327 can be individual hardware modules, firmware modules, a software module executed by a processor (e.g., the signal processor 350), etc. Layout manager 302 can also be implemented separately as a hardware component such as a microcontroller, ASIC, FPGA, hardware/firmware combination, a software module executed by a processor (e.g., the processor 340), etc.

In some embodiments, each of the endpoints 101-105 may include a layout manager 302 and a mixer 303 for determining the arrangement of the video streams displayed at that endpoint.

In some embodiments, the endpoints 101-105 may communicate without an MCU 106. Accordingly, some or all of the features shown in FIG. 3 as incorporated within the MCU 106 (i.e., the processor 340, the layout manager 302, etc.) may be incorporated within one or more of the endpoints 101-105.

Having thus described the operating environment, attention will now shift to the layout selections available according to the teaching herein. In addition to the conventional "continuous presence" layout mode, which is known to those skilled in the art, two additional modes are available: "Speaker Priority" and "Participants Priority." The "Speaker Priority" mode gives priority to video streams from the endpoint that includes the current speaker (the "current speaker endpoint") and displays those video streams in a larger size that video streams from other endpoints. The "Participants Priority" mode gives priority to displaying all participants possible. The telepresence layout mode may be set by either a user or an administrator in a conference profile setting of either an endpoint or a MCU. As described below, the layout selections are characterized as either reserved screens or grid screens.

Speaker Priority Mode

FIG. 4A-4D show exemplary reserved screens 400.

Figure 4A:
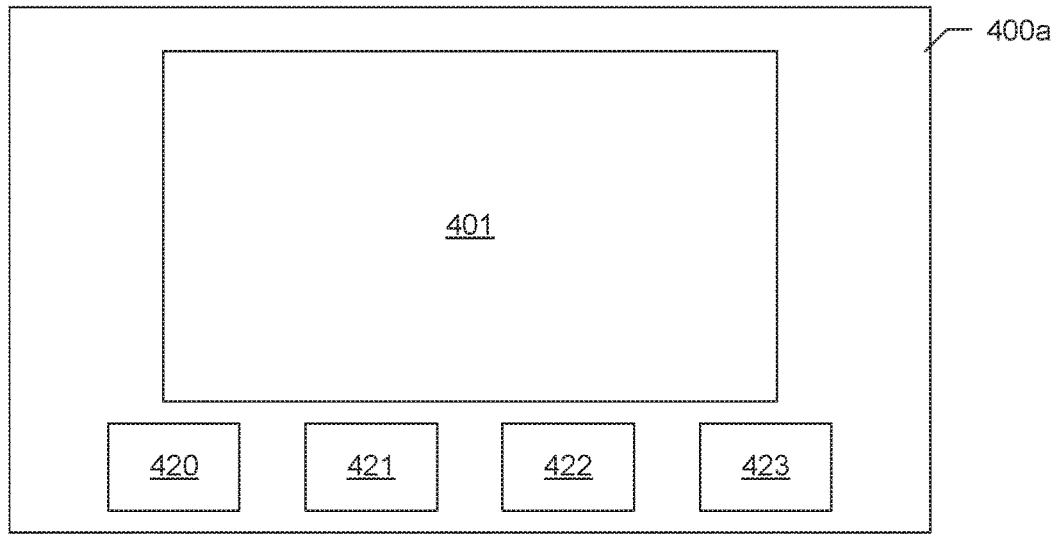
FIG. 4A-4D show exemplary reserved screens.
Figure 4B:
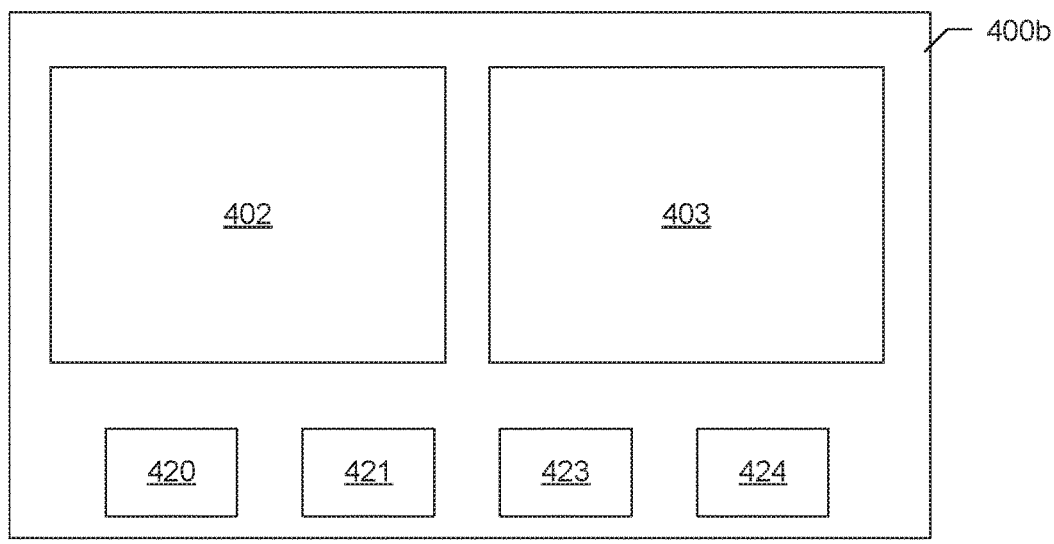
Figure 4C:
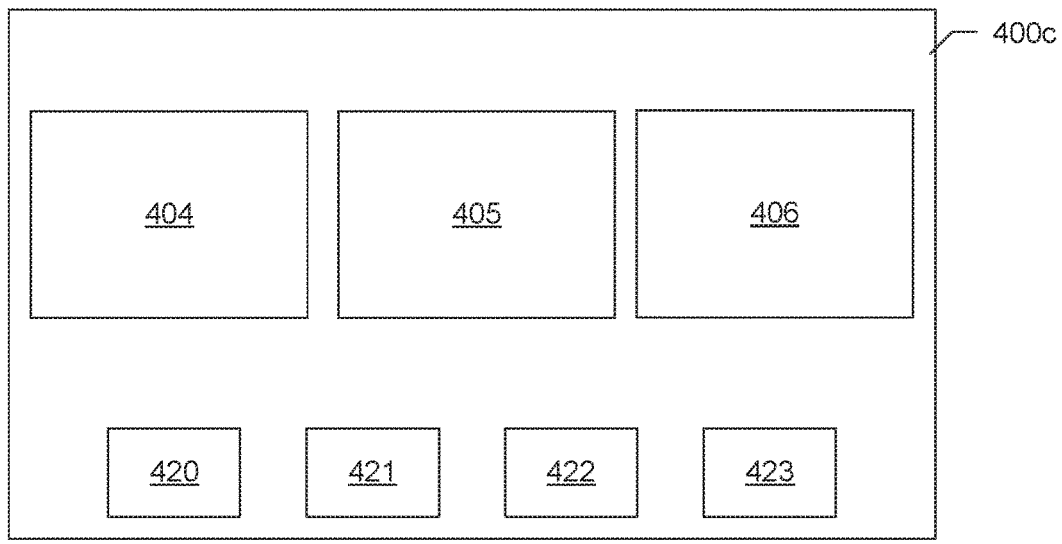
Figure 4D:
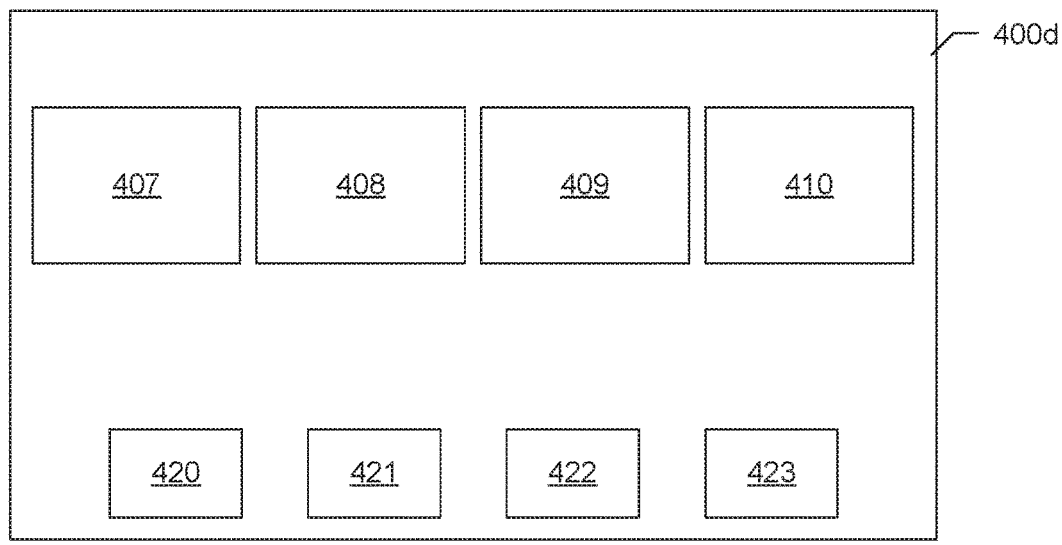

As shown in FIG. 4A, the reserved screen 400a includes a primary display area 401 and a plurality of (e.g., four) secondary display areas 420-423, which are smaller in size than the primary display area 401. The secondary display areas 420-423 may be arranged as filmstrip (as described, for example, in Provisional U.S. Patent Application 62/002,561, which is referenced above and incorporated by reference). The secondary display areas 420-423 may be above and/or below the primary display area 401. As shown in FIG. 4B, the reserved screen 400b includes two primary display areas 402 and 403 and a plurality of secondary display areas 420-423 above and/or below the primary display areas 402 and 403. As shown in FIG. 4C, the reserved screen 400c includes three primary display areas 404-406 and a plurality of secondary display areas 420-423. As shown in FIG. 4D, the reserved screen 400d includes four primary display areas 407-410 and a plurality of secondary display areas 420-423.

If an endpoint is utilizing a single display device, the layout manager 302 selects an appropriate layout for that display device based on the number of cameras at the endpoint that includes the current speaker (the "current speaker endpoint"). For example, if the current speaker endpoint includes only one camera, the layout manager 302 selects the reserved screen 400a and outputs the video stream from the current speaker endpoint in the primary display area 401. Similarly, if the current speaker endpoint has two cameras, the system selects the reserved screen 400b and outputs the video streams from the current speaker endpoint in the primary display areas 402 and 403. If the current speaker endpoint has three cameras, the layout manager 302 selects the reserved screen 400c and outputs the video streams from the current speaker endpoint in the primary display areas 404-406. If the current speaker endpoint has four cameras, the layout manager 302 selects the reserved screen 400d and outputs the video streams from the current speaker endpoint in the primary display areas 407-410. In each instance, video streams from additional endpoints may be shown in secondary display areas 420-423.

Figure 5:
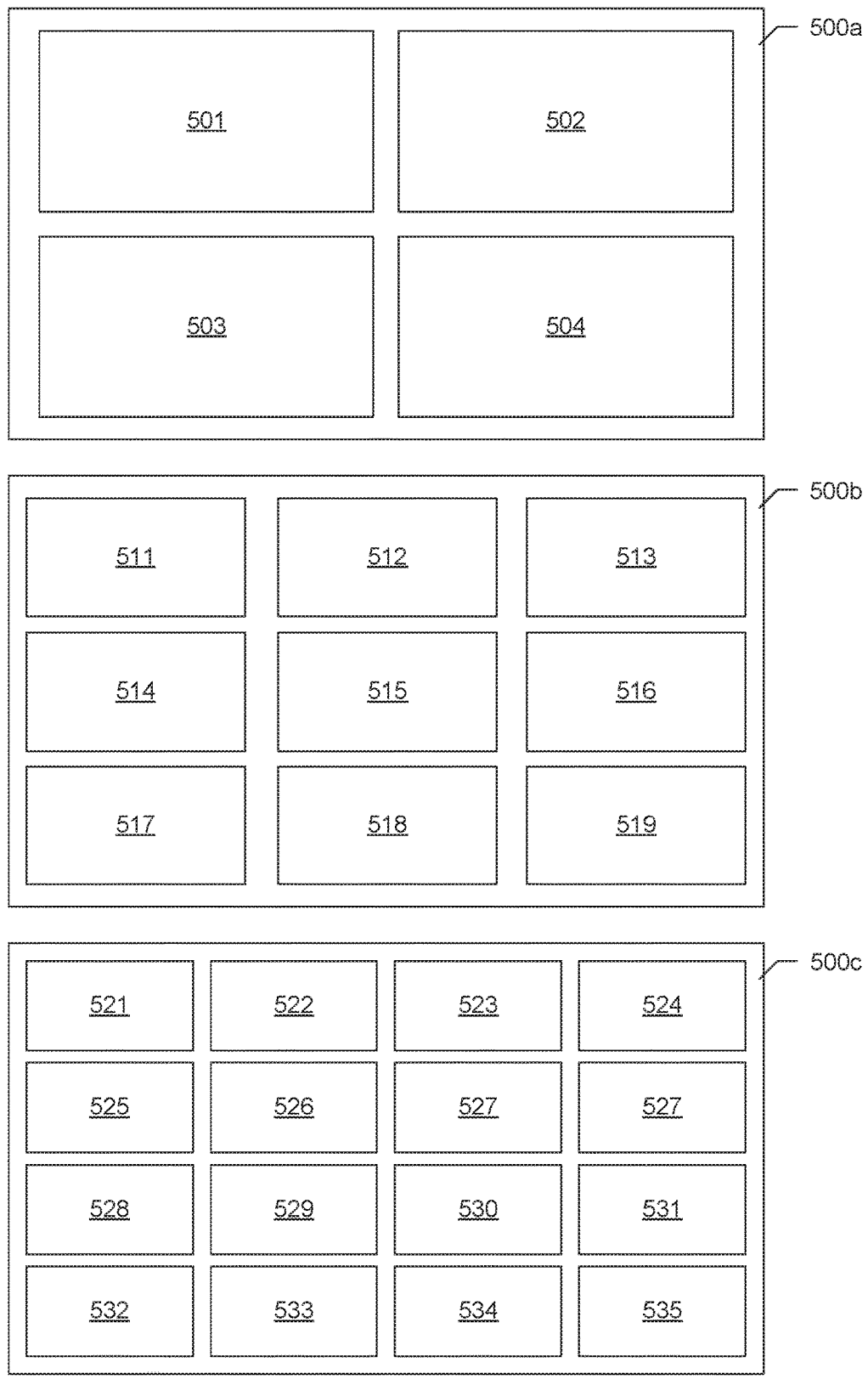
FIG. 5 show exemplary grid screens.

FIG. 5 shows exemplary grid screens 500. The grid screens 500 include display areas of substantially equal size arranged in columns and rows. The grid screens 500 may have an equal number of columns and rows. For example, the grid screen 500a includes four display areas 501-504 arranged in two rows and two columns. Similarly, the grid screen 500b includes nine display areas 511-519 arranged in three rows and three columns. The grid screen 500c includes sixteen display areas 521-535 arranged in four rows and four columns. As one of ordinary skill in the art will recognize, grid screens 500 may have any number of display areas arranged in any number of rows and any number of columns (including one display area in a single row/column).

FIGS. 6A-6C and 7A-7M show exemplary layouts selected by the layout manager 302 for an endpoint utilizing two display devices. At an endpoint utilizing two display devices, the number of reserved screens 400 selected by the layout manager 302 may be based on the number of cameras being utilized at other endpoints in the system. If one of the other endpoints is utilizing four cameras, the layout manager selects two reserved screens 400. If none of the other endpoints are utilizing four cameras, the layout manager 302 selects one reserved screen 400 and one grid screen 500.

Figure 6A:
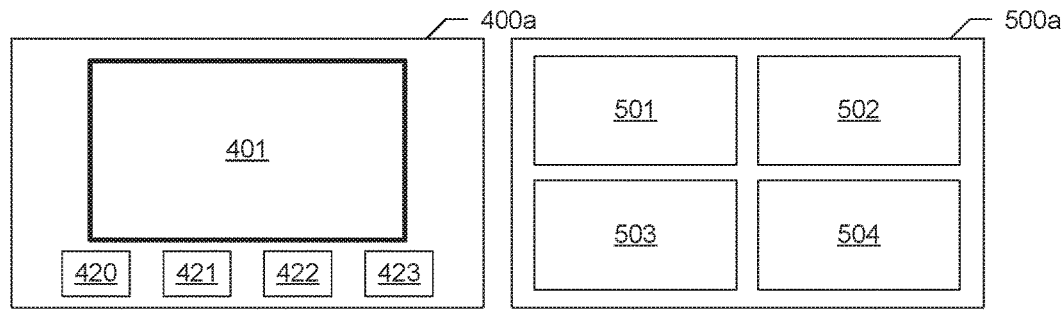
FIGS. 6A-6C show exemplary layouts for endpoints utilizing two display devices when none of the other endpoints are utilizing four cameras.
Figure 6B:
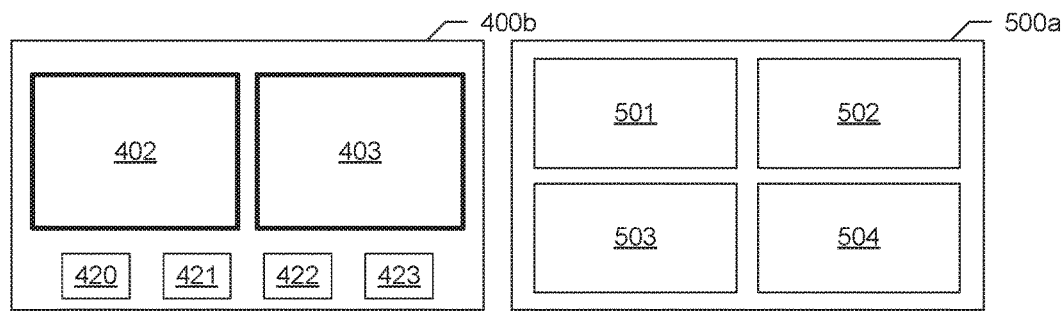
Figure 6C:
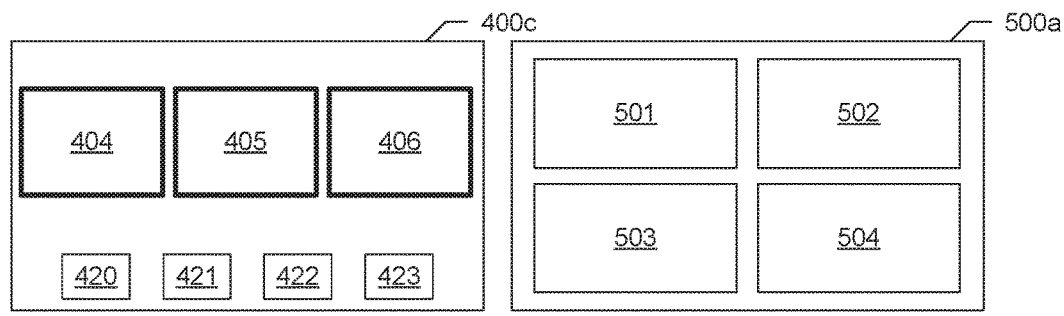

FIGS. 6A-6C illustrate layouts selected by the layout manager 302 at an endpoint utilizing two display devices when none of the other endpoints are utilizing four cameras.

As shown in FIG. 6A, if the current speaker endpoint is utilizing one camera, the layout manager 302 selects the reserved screen 400a and outputs the video stream from the current speaker endpoint in the primary display area 401. As shown in FIG. 6B, if the current speaker endpoint is utilizing two cameras, the layout manager 302 selects the reserved screen 400b and outputs the video streams from the current speaker endpoint in the primary display areas 402 and 403. As shown in FIG. 6C, if the current speaker endpoint is utilizing three cameras, the layout manager 302 selects the reserved screen 400c and outputs the video streams from the current speaker endpoint in the primary display areas 404-406.

In each of the embodiments disclosed herein, the layout manager may highlight the video streams from the current speaker endpoint. For example, the video streams from the current speaker endpoint may be shown with a thicker or different color border than video streams from other endpoints.

The layout manager 302 also outputs the video streams from the other endpoints in the display areas of the grid screens and, if necessary, the secondary display areas 420-423. In order to minimize disruption and display the video streams in the best possible layout, the layout manager 302 selects the grid screen 500 as follows:

If all of the video streams from the other endpoints can be displayed in a 3×3 (or smaller) grid screen, the secondary display areas 420-423 are not used. If there are more than nine video streams from additional endpoints, video streams are output to the secondary display areas 420-423 in addition to the grid screen 500b. If there are more than thirteen video streams from additional endpoints, layout manager 302 selects the 4×4 grid screen 500c.

If a grid screen 500 includes multiple video streams from the same endpoint, the layout manager 302 outputs the video streams from that endpoint in the same row. Accordingly, the layout manager 302 determines the minimum grid size based on the maximum number of cameras in other endpoints. For example, if one of the other endpoints is utilizing four cameras, the minimum grid size is the 4×4 grid screen 500c. Similarly, if one of the other endpoints is utilizing three cameras, the minimum grid size is the 3×3 grid screen 500b. If one of the other endpoints is utilizing two cameras, the minimum grid size is the 2×2 grid screen 500a.

Video streams are output to the secondary display areas 420-423 only if video streams are being output to all of the display areas of all of the grid screen 500. In other words, it is preferable to have fewer video streams in the secondary display areas 420-423 than to have an empty display area of a grid screen 500.

FIGS. 7A-7M show exemplary layouts selected by the layout manager 302 for an endpoint utilizing two display devices when at least one of the other endpoints is utilizing four cameras.

Figure 7A:
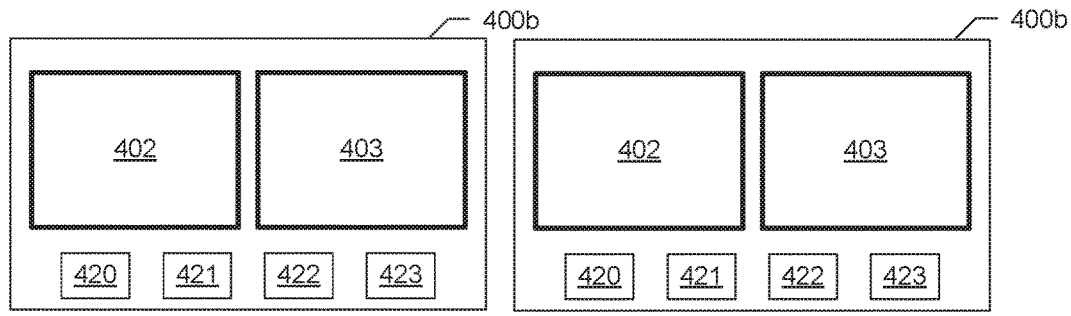
FIGS. 7A-7M show exemplary layouts for endpoints utilizing two display devices when at least one of the other endpoints is utilizing four cameras.

As shown in FIG. 7A, if the current speaker endpoint is utilizing four cameras, the layout manager selects the reserved screen 400b for both of the display devices and outputs the four video streams from the current speaker endpoint in the primary display areas 402 and 403 of both display devices.

If the current speaker endpoint is utilizing less than four cameras, the video streams from the current speaker endpoint do not need to be displayed across both of the reserved screens 400. Because the current speaker endpoint may be displayed on a single display device, conventional systems may output the video streams on a single display device and output the other video streams on the second display device (perhaps in a layout similar to a grid screen 500). Doing so, however, would cause all of the video streams to be moved and resized. Then, if an endpoint utilizing four cameras were to become the current speaker again, all the video streams would again need to be resized. Therefore, in order to overcome this problem arising in the realm of video conferencing, the layout manager 302 continues to output two reserved screens 400 regardless of whether the current speaker endpoint is utilizing four cameras. If the current speaker endpoint is utilizing fewer than four cameras, the layout manager 302 selects a second reserved screen 400 based on the number of cameras being utilized at the endpoint that includes the previous speaker ("the previous speaker endpoint")

Figure 7B:
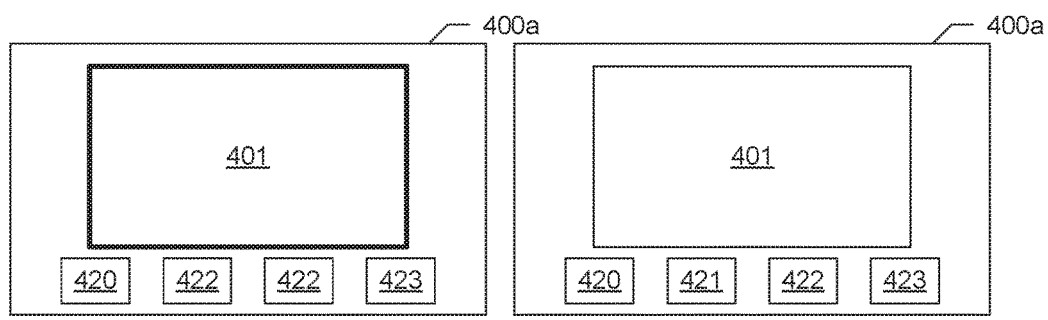

As shown in FIG. 7B, if the current speaker endpoint is utilizing one camera and the previous speaker endpoint is utilizing one camera, the layout manager 302 selects the reserved screen 400a for both of the display devices, outputs the video stream from the current speaker endpoint in the primary display area 401 of one of the display devices (e.g., the left display device), and outputs the video stream from the previous speaker endpoint in the primary display area 401 of the other display device (e.g., the right display device).

Figure 7C:
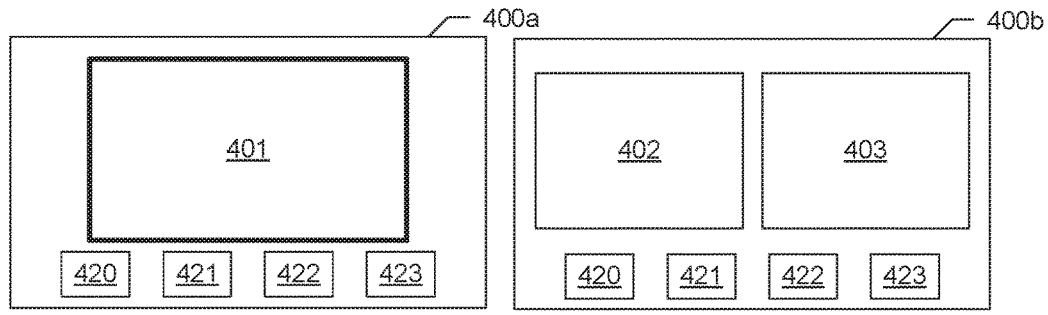

As shown in FIG. 7C, if the current speaker endpoint is utilizing one camera and the previous speaker endpoint is utilizing two cameras, the layout manager 302 selects the reserved screen 400a and the reserved screen 400b, outputs the video stream from the current speaker endpoint in the primary display area 401, and outputs the video streams from the previous speaker endpoint in the primary display areas 402 and 403.

Figure 7D:
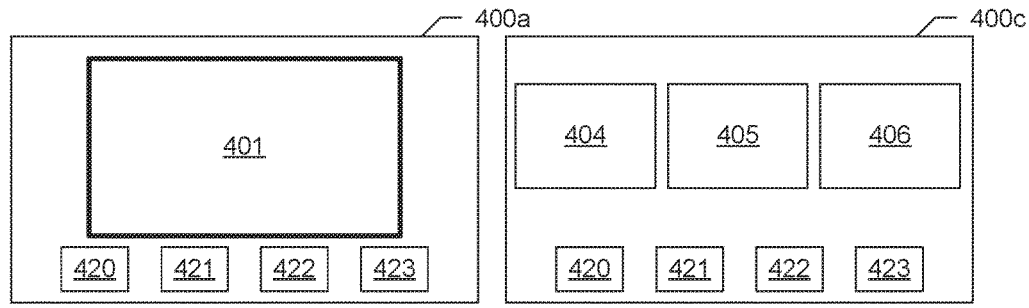

As shown in FIG. 7D, if the current speaker endpoint is utilizing one camera and the previous speaker endpoint is utilizing three cameras, the layout manager 302 selects the reserved screen 400a and the reserved screen 400c, outputs the video stream from the current speaker endpoint in the primary display area 401, and outputs the video streams from the previous speaker endpoint in the primary display areas 404-406.

Figure 7E:
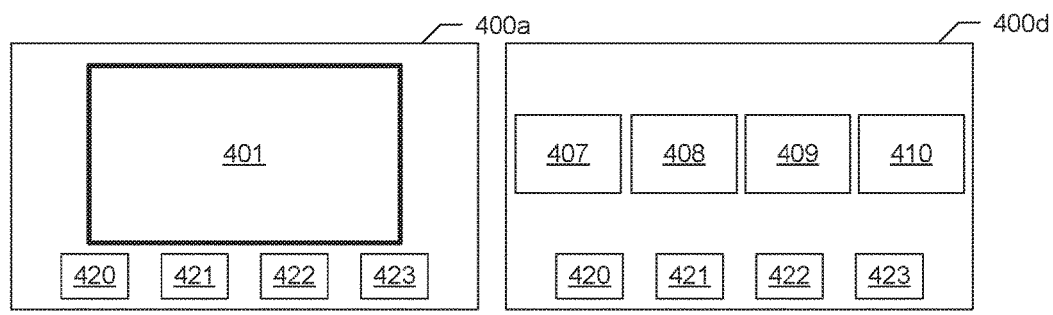

As shown in FIG. 7E, if the current speaker endpoint is utilizing one camera and the previous speaker endpoint is utilizing four cameras, the layout manager 302 selects the reserved screen 400a and the reserved screen 400d, outputs the video stream from the current speaker endpoint in the primary display area 401, and outputs the video streams from the previous speaker endpoint in the primary display areas 407-410.

Figure 7F:
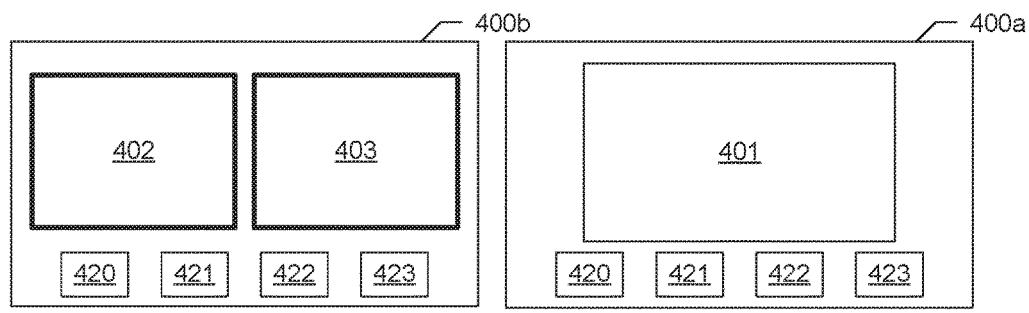

As shown in FIG. 7F, if the current speaker endpoint is utilizing two cameras and the previous speaker endpoint is utilizing one camera, the layout manager 302 selects the reserved screen 400b and the reserved screen 400a, outputs the video streams from the current speaker endpoint in the primary display areas 402 and 403, and outputs the video stream from the previous speaker endpoint in the primary display area 401.

Figure 7G:
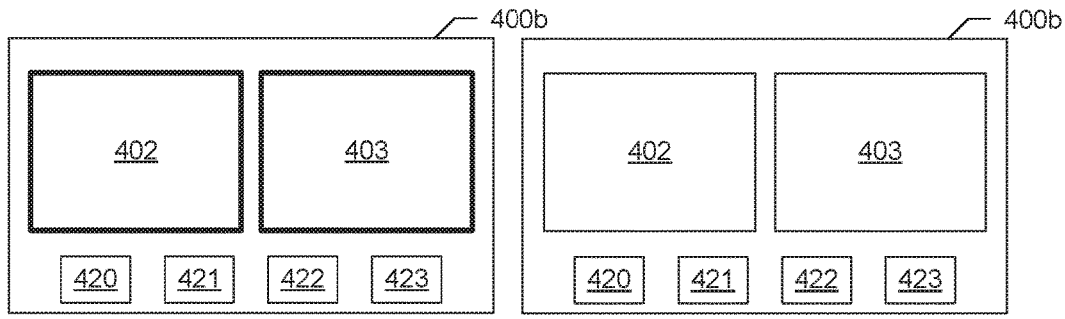

As shown in FIG. 7G, if both the current speaker endpoint and the previous speaker endpoint are utilizing two cameras, the layout manager 302 selects the reserved screens 400b for both of the display devices, outputs the video stream from the current speaker endpoint in the primary display areas 402 and 403 of one of the display devices (e.g., the left display device), and outputs the video streams from the previous speaker endpoint in the primary display areas 402 and 403 of the other display device (e.g., the right display device).

Figure 7H:
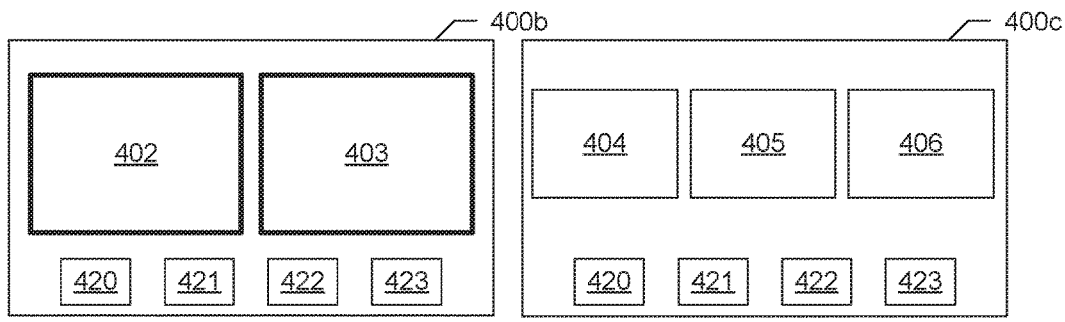

As shown in FIG. 7H, if the current speaker endpoint is utilizing two cameras and the previous speaker endpoint is utilizing three cameras, the layout manager 302 selects the reserved screen 400b and the reserved screen 400c, outputs the video streams from the current speaker endpoint in the primary display areas 402 and 403, and outputs the video streams from the previous speaker endpoint in the primary display areas 404-406.

Figure 7I:
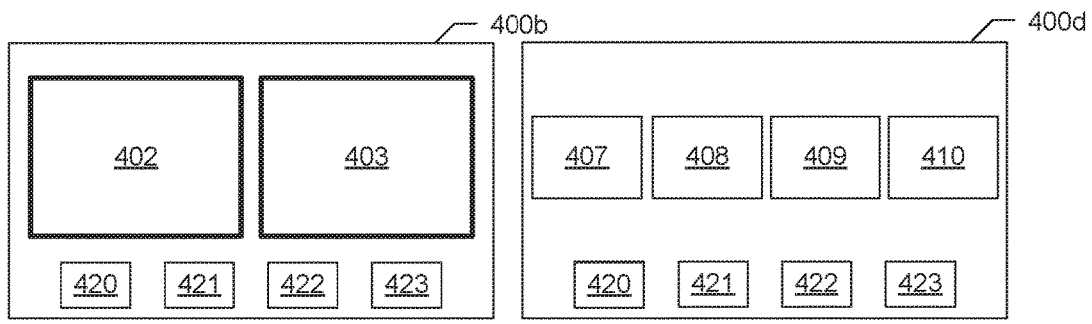

As shown in FIG. 7I, if the current speaker endpoint is utilizing two cameras and the previous speaker endpoint is utilizing four cameras, the layout manager 302 selects the reserved screen 400b and the reserved screen 400d, outputs the video streams from the current speaker endpoint in the primary display areas 402 and 403, and outputs the video streams from the previous speaker endpoint in the primary display areas 407-410.

Figure 7J:
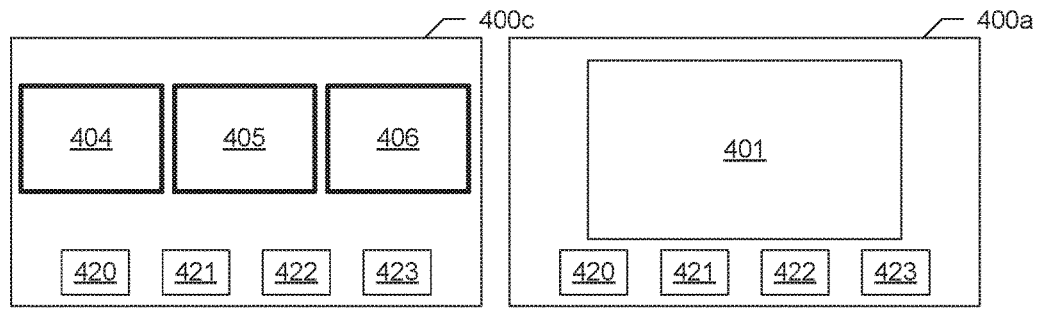

As shown in FIG. 7J, if the current speaker endpoint is utilizing three cameras and the previous speaker endpoint is utilizing one camera, the layout manager 302 selects the reserved screen 400c and the reserved screen 400a, outputs the video streams from the current speaker endpoint in the primary display areas 404-406, and outputs the video stream from the previous speaker endpoint in the primary display area 401.

Figure 7K:
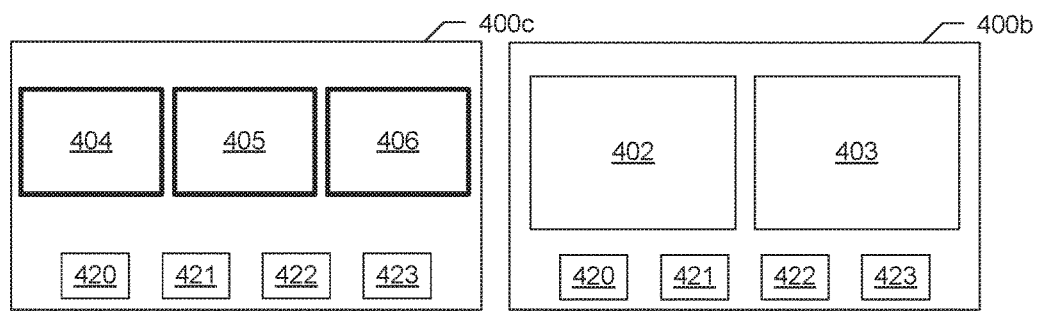

As shown in FIG. 7K, if the current speaker endpoint is utilizing three cameras and the previous speaker endpoint is utilizing two cameras, the layout manager 302 selects the reserved screen 400c and the reserved screen 400b, outputs the video streams from the current speaker endpoint in the primary display areas 404-406, and outputs the video stream from the previous speaker endpoint in the primary display areas 402 and 403.

Figure 7L:
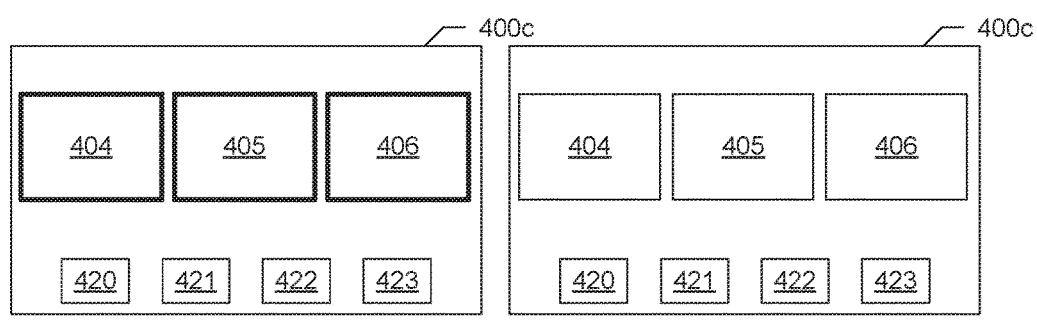

As shown in FIG. 7L, if both the current speaker endpoint and the previous speaker endpoint are utilizing three cameras, the layout manager 302 selects the reserved screens 400c for both of the display devices, outputs the video stream from the current speaker endpoint in the primary display areas 404-406 of one of the display devices (e.g., the left display device), and outputs the video streams from the previous speaker endpoint in the primary display areas 404-406 of the other display device (e.g., the right display device).

Figure 7M:
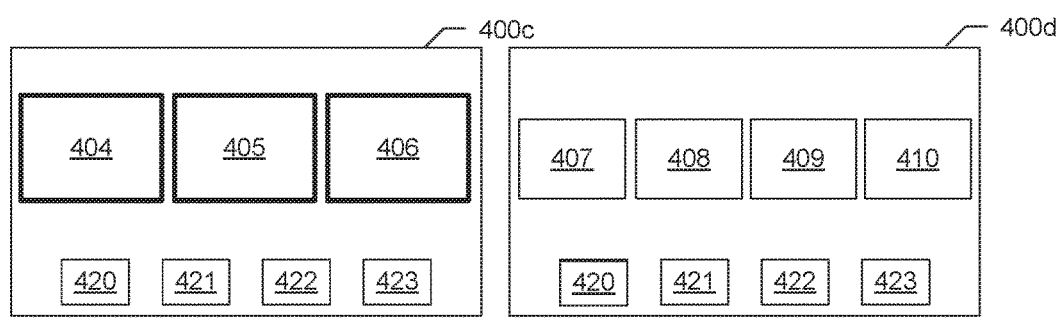

As shown in FIG. 7M, if the current speaker endpoint is utilizing three cameras and the previous speaker endpoint is utilizing four cameras, the layout manager 302 selects the reserved screen 400c and the reserved screen 400d, outputs the video streams from the current speaker endpoint in the primary display areas 404-406, and outputs the video stream from the previous speaker endpoint in the primary display areas 407-410.

FIGS. 8A-8B, 9A-9C, and 10A-10C show exemplary layouts selected by the layout manager 302 for endpoints utilizing three display devices.

At an endpoint utilizing three display devices, the number of reserved screens 400 selected by the layout manager 302 is based on the number of cameras being utilized at other endpoints in the system. If one of other endpoints in the system is utilizing three cameras, the layout manager 302 selects three reserved screens 400. If one of the other endpoints in the system is utilizing four cameras (and none of the other endpoints are utilizing three cameras), the layout manager selects two reserved screens 400 and one grid screen 500. If none of the other endpoints are utilizing three or four cameras, the layout manager 302 selects one reserved screen 400 and two grid screens 500.

Figure 8A:
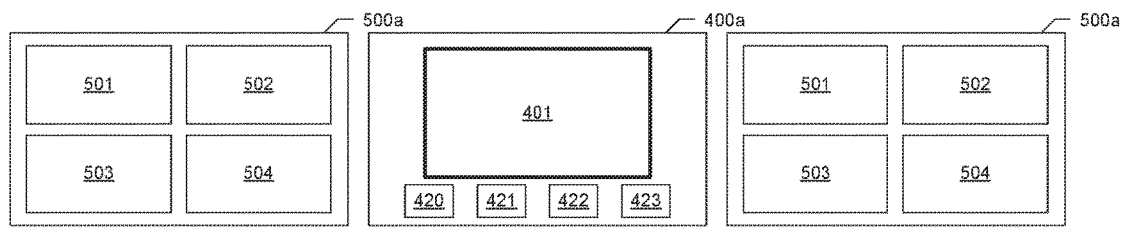
FIGS. 8A and 8B show exemplary layouts for endpoints utilizing three display devices when none of the other endpoints are utilizing three or four cameras.
Figure 8B:
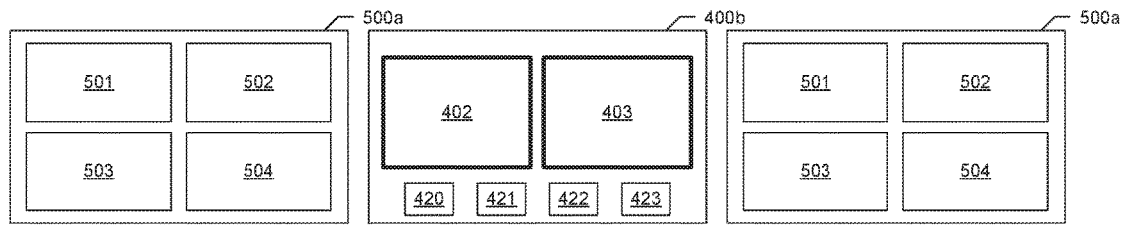

FIGS. 8A and 8B show exemplary layouts selected by the layout manager 302 for endpoints utilizing three display devices when none of the other endpoints are utilizing three or four cameras.

As shown in FIG. 8A, if the current speaker endpoint is utilizing one camera, the layout manager 302 selects the reserved screen 400a and outputs the video stream from the current speaker endpoint in the primary display area 401. The reserved screen 400a may be selected for the center display device as shown.

As shown in FIG. 8B, if the current speaker endpoint is utilizing two cameras, the layout manager 302 selects the reserved screen 400b for one of the display devices (e.g., for the center display device) and outputs the video streams from the current speaker endpoint in the primary display areas 402 and 403.

In each of the embodiments shown in FIGS. 8A-8B, the layout manager 302 also selects the grid screens 500 that best display the additional video streams from the additional endpoints. The process for selecting two grid screens 500 is similar to the process for selecting a single grid screen 500 as described above with reference to FIGS. 6A-6C. The layout manager 302 may select two grid screens 500 with different size grids.

Figure 9A:
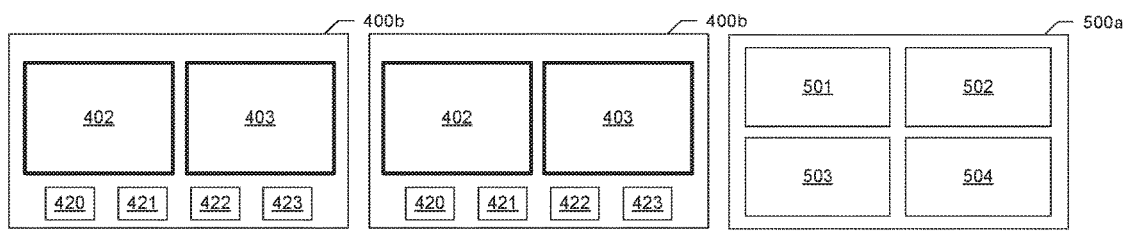
FIGS. 9A-9C show exemplary layouts for endpoints utilizing three display devices when at least one of the endpoints is utilizing four cameras (and none of the other endpoints are utilizing three cameras).
Figure 9B:
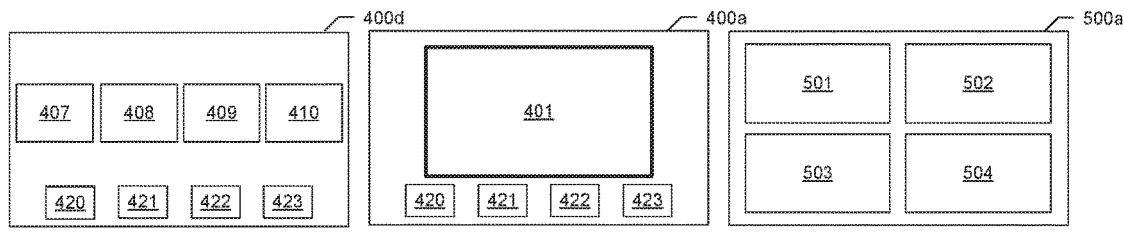
Figure 9C:
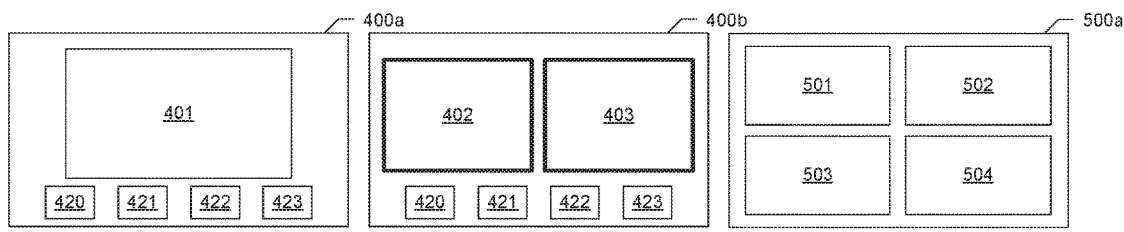

FIGS. 9A-9C show exemplary layouts selected by the layout manager 302 for endpoints utilizing three display devices when at least one of the endpoints is utilizing four cameras (and none of the other endpoints are utilizing three cameras). When at least one of the endpoints is utilizing four cameras (and none of the other endpoints are utilizing three cameras), the layout manager 302 selects two reserved screens 400 and one grid screen 500.

As shown in FIG. 9A, if the current speaker endpoint is utilizing four cameras, the layout manager selects two reserved screens 400b for two of the display devices and outputs the video feeds from the current speaker endpoint in the primary display areas 402 and 403.

If the current speaker endpoint is not utilizing four cameras, the video streams from the current speaker endpoint are not displayed across both of the reserved screens

400. In order to minimize disruption for the viewers as described above, the layout manager 302 selects the reserved screens 400 based on the number of cameras being utilized at both the current speaker endpoint and the previous speaker endpoint.

As shown in FIG. 9B, for example, if the current speaker endpoint is utilizing one camera and the previous speaker endpoint is utilizing four cameras, the layout manager 302 selects the reserved screen 400a for one of the display devices (e.g., the center display device), outputs the video stream from the current speaker in the primary display area 401, selects the reserved screen 400d as the other reserved screen, and outputs the video streams from the previous speaker endpoint in the primary display areas 407-410.

As shown in FIG. 9C, for example, if the current speaker endpoint is utilizing two cameras and the previous speaker endpoint is utilizing one camera, the layout manager 302 selects the reserved screen 400b for one of the display devices (e.g., the center display device), outputs the video streams from the current speaker in the primary display areas 402 and 403, selects the reserved screen 400a as the other reserved screen, and outputs the video streams from the previous speaker endpoint in the primary display area 401.

In each of the embodiments shown in FIGS. 9A-9C, the layout manager 302 also selects the grid screen 500 that best displays the additional video streams from the additional endpoints as described above with reference to FIGS. 6A-6C.

Figure 10A:
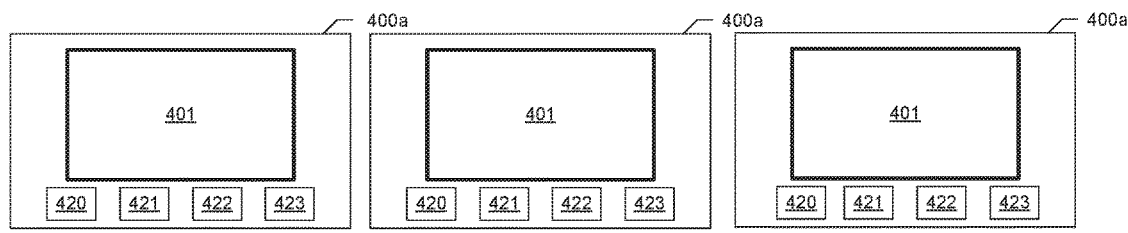
FIGS. 10A-10D show exemplary layouts for endpoints utilizing three display devices when at least one of the other endpoints is utilizing three cameras.
Figure 10B:
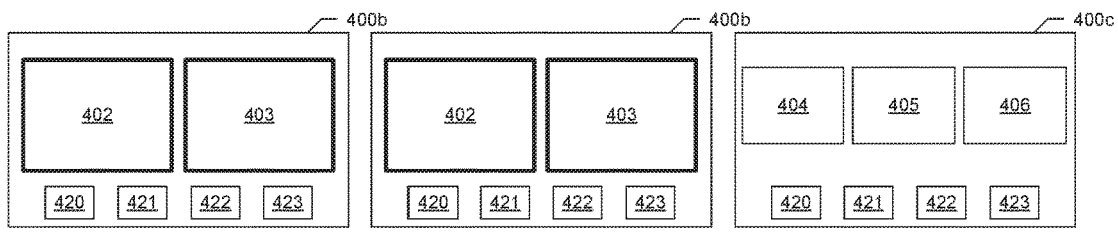
Figure 10C:
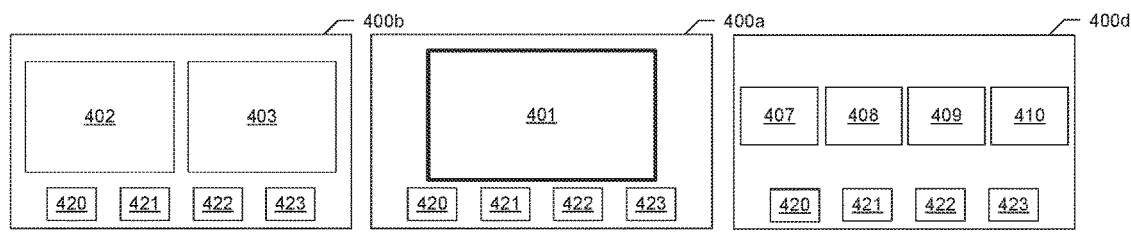

FIGS. 10A-10C show exemplary layouts selected by the layout manager 302 for endpoints utilizing three display devices when at least one of the other endpoints is utilizing three cameras. When one of the other endpoints is utilizing three cameras, the layout manager 302 selects three reserved screens 400.

As shown in FIG. 10A, if the current speaker endpoint is utilizing three cameras, the layout manager selects the reserved screen 400a for all three display devices and outputs the video streams from the current speaker endpoint in the primary display areas 401.

If the current speaker endpoint is not utilizing three cameras, the video streams from the current speaker endpoint are not displayed across all three of the reserved screens 400. Accordingly, the layout manager 302 may select the reserved screens 400 based on the number of cameras being utilized at both the current speaker endpoint and the previous speaker endpoint.

As shown in FIG. 10B, if the current speaker endpoint is utilizing four cameras, the layout manager 302 selects the reserved screen 400b for two of the display devices and outputs the four video streams from the current speaker endpoint in the primary display areas 402 and 403 of both of the reserved screens 400b. The layout manager 302 also selects the third reserved screen 400 based on the number of cameras being utilized in at the previous speaker endpoint. As shown in FIG. 10B, for example, if the previous speaker endpoint is utilizing three cameras, the layout manager 302 selects the reserved screen 400c and outputs the video streams from the previous speaker endpoint in the primary display areas 404-406.

If the current speaker endpoint is utilizing one or two cameras, the layout manager selects the appropriate reserved screen 400 for one of the display devices (e.g., the center display device) and selects the other two reserved screens 400 based on the number of cameras being utilized at two previous speaker endpoints.

As shown in FIG. 10C, for example, if the current speaker endpoint is utilizing one camera, one previous speaker endpoint is utilizing four cameras, and another previous speaker endpoint is utilizing two cameras, the layout manager selects the reserved screen 400a and outputs the video stream from the current speaker endpoint in the primary display area 401, selects the reserved screen 400d and outputs the four video streams from one previous speaker endpoint in the primary display areas 407-410, and selects the reserved screen 400b and outputs the two video streams from the other previous speaker endpoint in the primary display areas 402 and 403.

In each of the embodiments disclosed herein, if a previous speaker endpoint is being displayed in one or more primary display area(s) and the previous speaker endpoint becomes the current speaker endpoint (i.e., someone beings speaking again), the layout manager 302 may simply highlight the video streams from the previous speaker endpoint (now the current speaker endpoint) instead of moving the video streams from the previous speaker endpoint (now the current speaker endpoint) to the center display device.

Figure 10D:
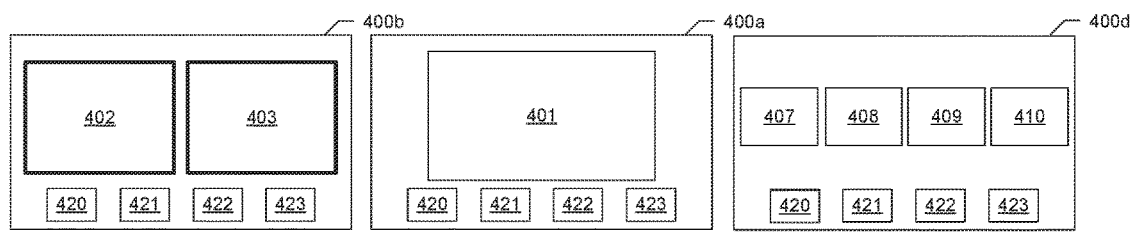

As shown in FIGS. 10C and 10D, for example, if someone from the previous speaker endpoint being shown in primary display areas 402 and 403 begins speaking, the layout manager 302 may highlight the display areas 402 and 403 rather than moving the video streams from the endpoint being shown in the primary display areas 402 and 403 to the center display device.

At endpoints utilizing more than three display devices, the layout manager 302 selects the number of reserved screens 400 in the same manner as for endpoints utilizing three display devices (except that, for each additional display device over three, the layout manager 302 selects a grid screen 500 as discussed below.

Figure 11:
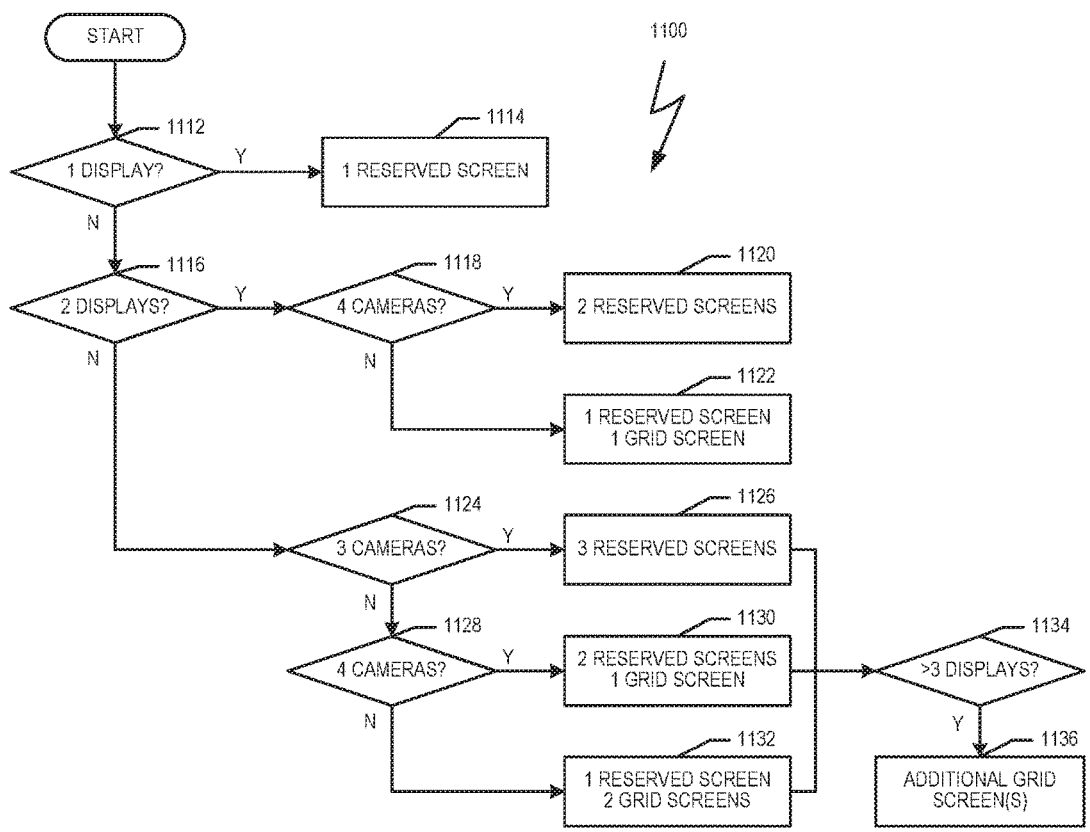
FIG. 11 is a flowchart showing an exemplary process to determine the number of reserved screens and the number of grid screens at an endpoint.

FIG. 11 is a flowchart showing an exemplary process 1100 to determine the number of reserved screens 400 and the number of grid screens 500 at an endpoint. The process 1100 may be performed by the layout manager 302, which may be incorporated within the MCU 106 and/or an endpoint 101-105 as described above.

If, at 1112, it is determined that the endpoint is utilizing one display device, one reserved screen 400 is selected at 1114. If, at 1116, it is determined that the endpoint is utilizing two display devices, it is determined at 1118 whether any of the other endpoints are utilizing four cameras. If so (1118: Yes), two reserved screens 400 are selected at 1120. If none of the other endpoints are utilizing four cameras (1118: No), one reserved screen 400 and one grid screen 500 are selected at 1122.

If it is determined that the endpoint is utilizing three or more display devices (1116: No), a determination is made at 1124 whether any of the other endpoints are utilizing three cameras. If so (1124: Yes), three reserved screens 400 are selected at 1126. If none of the other endpoints are utilizing three cameras (1124: No), a determination is made at 1128 whether any of the other endpoints are utilizing four cameras. If so (1128: Yes), two reserved screens 400 and one grid screen 500 are selected at 1130. If none of the other endpoints are utilizing four cameras (1128: No), one reserved screen 400 and two grid screens 500 are selected. At 1134, a determination is made whether there are more than three display devices at the endpoint. If so (1134: Yes), an additional grid screen 500 is selected for each additional display device.

Participant Priority Mode

In general, participant priority mode can be used when it is desired to show as many conference participants as possible using the largest cell size possible. Such an arrangement outputs grid screens 500 to all display devices, applying the same grid screen logic as in speaker priority mode discussed above with reference to FIGS. 6A-6C.

If an endpoint is utilizing multiple cameras, the layout manager 302 selects a grid screen 500 with sufficient columns to output all of the video streams from that endpoint in the same row.

If the layout manager 302 outputs multiple grid screens 500, the layout manager 302 attempts to output all of the video streams in grid screens 500 with the same grid size. If there is an insufficient number of display areas, the layout manager 302 increases the number of columns/rows of each of the grid screens by one. In other words, if two 2×2 grid screens are insufficient and one 3×3 grid screen and one 2×2 grid screen is insufficient the layout manager 302 determines whether two 3×3 grid screens are sufficient rather than using one 4×4 grid screen and one 2×2 grid screen.

If the layout manager 302 outputs multiple grid screens 500 with different grid sizes, the layout manager 302 outputs the grid screen 500 with the smallest grid (and largest display areas) to a centrally-located display device and outputs video streams to a grid screen 500 with a larger grid (and smaller display areas) only if the smallest grid is full.

Rather than leaving a grid screen 500 blank, the layout manager 302 partially fills more than one grid screen 500.

The layout manager 302 may highlight the video stream(s) from the current speaker endpoint as described above.

Detailed descriptions of the embodiments described above are also shown in the attached appendices, wherein the endpoint that includes the current speaker is sometimes referred to as the first priority and the endpoints that include the previous speakers are referred to as the second priority, the third priority, etc.

Appendix 1.1 shows exemplary reserved screens 400 and grid screens 500 selected by the layout manager 302 in the speaker priority mode.

Appendix 1.1.1 shows exemplary reserved screens 400 and grid screens 500 selected by the layout manager 302 for a first endpoint when the maximum number of cameras utilized by the other endpoints is one.

Appendix 1.1.2 shows exemplary reserved screens 400 and grid screens 500 selected by the layout manager 302 for a first endpoint when the maximum number of cameras utilized by the other endpoints is two.

Appendix 1.1.3 shows exemplary reserved screens 400 and grid screens 500 selected by the layout manager 302 for a first endpoint when the maximum number of cameras utilized by the other endpoints is three.

Appendix 1.1.4 shows exemplary reserved screens 400 and grid screens 500 selected by the layout manager 302 for a first endpoint when the maximum number of cameras utilized by the other endpoints is four.

Appendix 1.2 shows exemplary grid screens 500 selected by the layout manager 302 in the speaker priority mode.

Appendix 1.2.1 shows one exemplary grid screens 500 selected by the layout manager 302.

Appendix 1.2.2 shows two exemplary grid screens 500 selected by the layout manager 302.

Appendix 1.2.3 shows three exemplary grid screens 500 selected by the layout manager 302.

Appendix 1.3 shows exemplary reserved screens 400 and grid screens 500 selected by the layout manager 302 in the speaker priority mode.

Appendix 1.3.1 shows exemplary reserved screens 400 and grid screens 500 selected by the layout manager 302 for a first endpoint when the maximum number of cameras utilized by the other endpoints is three, there are three reserved screens, the speaker location has one camera, the second priority location has three cameras and there are five additional cells to display (third-seventh priority).

Appendix 1.3.2 shows exemplary reserved screens 400 and grid screens 500 selected by the layout manager 302 for a first endpoint when the maximum number of cameras utilized by the other endpoints is three, there are three reserved screens, the speaker location has three cameras, the second priority location has three cameras, the seventh priority location has two cameras and there are nine additional cells to display (second-seventh priority).

Appendix 1.3.3 shows exemplary reserved screens 400 and grid screens 500 selected by the layout manager 302 for a first endpoint when the maximum number of cameras utilized by the other.

Appendix 1.3.4 shows exemplary reserved screens 400 and grid screens 500 selected by the layout manager 302 for a first endpoint when the maximum number of cameras utilized by the other endpoints is three, there are three reserved screens, the speaker location has one camera, the second and third priority locations have three cameras, and there are seven additional cells to display.

Appendix 1.3.5 shows exemplary reserved screens 400 and grid screens 500 selected by the layout manager 302 for a first endpoint when the maximum number of cameras utilized by the other endpoints is two, there are three screens, only one reserved, the speaker location has one camera, the second and fourth priority locations have two cameras, and there are seven additional cells to display (second-sixth priority).

Appendix 1.4 shows exemplary grid screens 500 selected by the layout manager 302 in the participants priority mode.

Appendix 1.4.1 shows exemplary grid screens 500 selected by the layout manager 302 for a first endpoint when the maximum number of cameras utilized by the other endpoints is one.

Appendix 1.4.2 shows exemplary grid screens 500 selected by the layout manager 302 for a first endpoint when the maximum number of cameras utilized by the other endpoints is two.

Appendix 1.4.3 shows exemplary grid screens 500 selected by the layout manager 302 for a first endpoint when the maximum number of cameras utilized by the other endpoints is three.

Appendix 1.4.4 shows exemplary grid screens 500 selected by the layout manager 302 for a first endpoint when the maximum number of cameras utilized by the other endpoints is four and at least one of the other endpoints is utilizing three cameras.

Appendix 1.4.5 shows exemplary grid screens 500 selected by the layout manager 302 for a first endpoint when the maximum number of cameras utilized by the other endpoints is four and none of the other endpoints are utilizing three cameras.

Appendix 1.5 shows exemplary grid screens 500 selected by the layout manager 302 in the speaker priority mode.

Appendix 1.5.1 shows exemplary grid screens 500 selected by the layout manager 302 for a first endpoint when the maximum number of cameras utilized by the other endpoints is three, the second priority endpoint has three cameras and the total number of cells is ten.

Appendix 1.5.2 shows exemplary grid screens 500 selected by the layout manager 302 for a first endpoint when the maximum number of cameras utilized by the other endpoints is three, the first and second priority endpoints have three cameras and the total number of cells is twelve.

Appendix 1.5.3 shows exemplary grid screens 500 selected by the layout manager 302 for a first endpoint when the maximum number of cameras utilized by the other endpoints is three, the first and second priority endpoints have three cameras and the total number of cells is ten.

Appendix 1.5.4 shows exemplary grid screens 500 selected by the layout manager 302 for a first endpoint when the maximum number of cameras utilized by the other endpoints is three, the second and third priority endpoints have three cameras and the total number of cells is ten.

Appendix 1.5.5 shows exemplary grid screens 500 selected by the layout manager 302 for a first endpoint when the maximum number of cameras utilized by the other endpoints is two, the second priority endpoint has two cameras and the total number of cells is eight.

Appendix 1.5.6 shows exemplary grid screens 500 selected by the layout manager 302 for a first endpoint when the maximum number of cameras utilized by the other endpoints is four, the second priority endpoint has four cameras and the total number of cells is eight.

Various modifications, extensions, and changes to the systems and algorithms described herein may be implemented without departing from the spirit and scope of the present invention. Additionally, the various algorithms described herein may be implemented in hardware, software, firmware, or any combination thereof.

The invention claimed is:

1. A videoconferencing device for a videoconferencing system having a plurality of endpoints, the plurality of endpoints including a first endpoint and one or more additional endpoints in network communication, each of the plurality of endpoints having one or more display devices and one or more cameras, the videoconferencing device comprising:
   a processor that receives one or more video streams from each of the plurality of endpoints and determines a current speaker endpoint; and
   a layout manager that determines a number of display devices being utilized at a first endpoint and determines a maximum number of cameras being utilized at each of the one or more additional endpoints,
   wherein, in a participant priority mode, the layout manager determines a spatial arrangement for the first endpoint comprising a grid screen for each display device at the first endpoint, each grid screen comprising one or more display areas of substantially equal size arranged in one or more rows and one or more columns, and the layout manager selects the number of columns in each grid screen of the spatial arrangement such that, for each of the one or more additional endpoints utilizing multiple cameras, the video streams are arranged adjacent to each other in the same row.

2. The videoconferencing device of claim 1, wherein, in a speaker priority mode:
   the spatial arrangement comprises one or more reserved screens comprising one or more primary display areas and one or more secondary display areas that are smaller than the one or more primary display areas; and
   the layout manager determines the spatial arrangement such that the one or more video streams from the current speaker endpoint are output to the one or more primary display areas of at least one of the one or more reserved screens.

3. The videoconferencing device of claim 2, wherein the layout manager determines a number of reserved screens output at the first endpoint based on the number of display devices being utilized at the first endpoint and the maximum number of cameras being utilized at each of the one or more additional endpoints.

4. The videoconferencing device of claim 3, wherein the layout manager determines the spatial arrangement such that three reserved screens are output at the first endpoint if the first endpoint is utilizing three or more display devices and at least one of the additional endpoints is utilizing three cameras.

5. The videoconferencing device of claim 4, wherein the layout manager determines the spatial arrangement such that one or more video streams are output from a previous speaker endpoint in the one or more primary display areas of at least one of the reserved screens if the current speaker endpoint is not utilizing three cameras.

6. The videoconferencing device of claim 3, wherein the layout manager determines the spatial arrangement such that two reserved screens are output if the first endpoint is utilizing two or more display devices, at least one additional endpoint is utilizing four cameras, and none of the additional endpoints are utilizing three cameras.

7. The videoconferencing device of claim 3, wherein the spatial arrangement also comprises one or more grid screens comprising a plurality of display areas of substantially equal size if the number of reserved screens output at the first endpoint is less than the number of display devices being utilized at the first endpoint.

8. The videoconferencing device of claim 7, wherein:
   the secondary display areas of the one or more reserved screens and the display areas of the one or more grid screens are arranged in rows; and
   the layout manager determines the spatial arrangement such that all video streams from a second endpoint are output in the same row if the second endpoint is utilizing multiple cameras.

9. A method of generating a layout for a videoconference in a videoconferencing system having a plurality of endpoints, the plurality of endpoints including a first endpoint and one or more additional endpoints in network communication, each of the plurality of endpoints having one or more display devices and one or more cameras, the method comprising:
   receiving one or more video streams from each of the plurality of endpoints;
   determining a current speaker endpoint; and
   determining a number of display devices being utilized at a first endpoint;
   determining a maximum number of cameras being utilized at each of the one or more additional endpoints; and,
   in a participant priority mode, determining a spatial arrangement for the first endpoint comprising a grid screen for each display device at the first endpoint, each grid screen comprising one or more display areas of substantially equal size arranged in one or more rows and one or more columns, wherein the number of columns in each grid screen of the spatial arrangement is selected such that, for each of the one or more additional endpoints utilizing multiple cameras, the video streams are arranged adjacent to each other in the same row.

10. The method of claim 9, wherein, in a speaker priority mode, the layout comprises one or more reserved screens comprising one or more primary display areas and one or more secondary display areas that are smaller than the one or more primary display areas, the method further comprising:

outputting the one or more video streams from the current speaker endpoint to the one or more primary display areas of at least one of the one or more reserved screens.

11. The method of claim 10, wherein determining the layout comprises determining a number of reserved screens output at the first endpoint based on the number of display devices being utilized at the first endpoint and the maximum number of cameras being utilized at each of the one or more additional endpoints.

12. The method of claim 11, wherein determining the layout further comprises outputting three reserved screens at the first endpoint if the first endpoint is utilizing three or more display devices and at least one of the additional endpoints is utilizing three cameras.

13. The method of claim 12, further comprising:
outputting one or more video streams from a previous speaker endpoint in the one or more primary display areas of at least one of the reserved screens if the current speaker endpoint is not utilizing three cameras.

14. The method of claim 12, wherein determining the layout further comprises outputting two reserved screens at the first endpoint if the first endpoint is utilizing two or more display devices, at least one additional endpoint is utilizing four cameras, and none of the additional endpoints are utilizing three cameras.

15. The method of claim 11, wherein the layout further comprises one or more grid screens comprising a plurality of display areas of substantially equal size if the number of reserved screens output at the first endpoint is less than the number of display devices being utilized at the first endpoint.

16. The method of claim 15, wherein the secondary display areas of the one or more reserved screens and the display areas of the one or more grid screens are arranged in rows, the method further comprising:
outputting all video streams from a second endpoint in the same row if the second endpoint is utilizing multiple cameras.

17. The videoconferencing device of claim 1, wherein, in the participant priority mode, each grid screen includes an equal number of columns and rows.

18. The videoconferencing device of claim 1, wherein, in the participant priority mode, the number of columns in each grid screen is selected such that, for each of the one or more additional endpoints utilizing multiple cameras, the video streams are arranged in the same row of the same display device.

19. The method of claim 9, wherein, in the participant priority mode, each grid screen includes an equal number of columns and rows.

20. The method of claim 9, wherein, in the participant priority mode, the number of columns in each grid screen is selected such that, for each of the one or more additional endpoints utilizing multiple cameras, the video streams are arranged in the same row of the same display device.

* * * * *